(12) United States Patent
Bruemmer et al.

(10) Patent No.: US 12,214,646 B2
(45) Date of Patent: Feb. 4, 2025

(54) COOLING SYSTEM

(71) Applicant: MAHLE International GmbH, Stuttgart (DE)

(72) Inventors: Richard Bruemmer, Stuttgart (DE); Gunther Hentschel, Uhingen (DE); Rainer Lutz, Steinheim (DE); Thomas Strauss, Notzingen (DE)

(73) Assignee: Mahle International GmbH (DE)

( * ) Notice: Subject to any disclaimer, the term of this patent is extended or adjusted under 35 U.S.C. 154(b) by 24 days.

(21) Appl. No.: 18/084,538

(22) Filed: Dec. 19, 2022

(65) Prior Publication Data

US 2023/0191879 A1   Jun. 22, 2023

(30) Foreign Application Priority Data

Dec. 20, 2021   (DE) ...................... 10 2021 214 729.1

(51) Int. Cl.
   B60H 1/32   (2006.01)

(52) U.S. Cl.
   CPC .................................. B60H 1/3202 (2013.01)

(58) Field of Classification Search
   CPC ... B60L 58/26; B60L 58/33; B60K 2001/003; B60K 11/02; B60H 1/00885; B60H 1/00899; B60H 1/3202
   See application file for complete search history.

(56) References Cited

U.S. PATENT DOCUMENTS

| | | | | |
|---|---|---|---|---|
| 6,450,275 B1 * | 9/2002 | Gabriel | .................... | B60K 6/22 165/41 |
| 6,569,550 B2 * | 5/2003 | Khelifa | .................. | B60H 1/323 429/434 |
| 7,182,049 B2 * | 2/2007 | Wikstrom | .............. | F02M 26/23 123/41.31 |
| 7,634,978 B2 * | 12/2009 | Boudard | .................. | F01P 11/20 123/41.31 |
| 8,215,427 B2 * | 7/2012 | Rouaud | .................... | F01P 7/165 701/22 |
| 8,857,480 B2 * | 10/2014 | Sullivan | ............... | F01P 11/0204 141/234 |

(Continued)

FOREIGN PATENT DOCUMENTS

| | | |
|---|---|---|
| DE | 102016200612 A1 | 7/2017 |
| DE | 102018111563 A1 | 11/2019 |

OTHER PUBLICATIONS

German Search Report dated Nov. 23, 2022 for German Patent App. No. DE102021214729.1 (w_machine_translation).

*Primary Examiner* — Nelson J Nieves

(74) *Attorney, Agent, or Firm* — Fishman Stewart PLLC

(57) ABSTRACT

A cooling system for a vehicle may include a cooling circuit through which a coolant is flowable. The cooling circuit may include a first heat source, a first radiator, a second heat source, a second radiator, and a hydraulic switch. The first heat source may be coolable at a lower temperature level. The second heat source may be coolable at a higher temperature level. The first heat source, the first radiator, the second heat source, and the second radiator may be connected in series with one another in the cooling circuit. The hydraulic switch may divide the cooling circuit into (i) a first partial circuit with the first heat source and the first radiator and (ii) a second partial circuit with the second heat source and the second radiator.

20 Claims, 1 Drawing Sheet

(56) References Cited

U.S. PATENT DOCUMENTS

| | | | | |
|---|---|---|---|---|
| 8,875,820 | B2* | 11/2014 | Yamashita | E02F 9/2091 |
| | | | | 180/65.265 |
| 10,125,664 | B2* | 11/2018 | Kim | F01P 7/165 |
| 11,919,360 | B2* | 3/2024 | Takagi | B60L 58/26 |
| 11,919,383 | B2* | 3/2024 | Surace | B60K 6/24 |
| 2008/0251303 | A1* | 10/2008 | Rouaud | B60L 50/15 |
| | | | | 701/22 |
| 2015/0101789 | A1* | 4/2015 | Enomoto | B60H 1/039 |
| | | | | 236/35 |
| 2016/0339761 | A1* | 11/2016 | Enomoto | B60H 1/00899 |
| 2017/0167355 | A1* | 6/2017 | Kim | F01P 7/167 |
| 2018/0050605 | A1* | 2/2018 | Lewis | B60L 58/25 |
| 2019/0176057 | A1* | 6/2019 | Mendez | H01M 10/625 |
| 2020/0018222 | A1* | 1/2020 | Tholander | B60H 1/323 |
| 2020/0276899 | A1* | 9/2020 | Gramann | B60K 1/00 |
| 2022/0161686 | A1* | 5/2022 | Choi | H01M 8/04768 |
| 2022/0163132 | A1* | 5/2022 | Jeong | B60H 1/00921 |
| 2023/0104670 | A1* | 4/2023 | Mothier | H01M 8/04037 |
| | | | | 429/437 |
| 2023/0145211 | A1* | 5/2023 | Mohlin | B01D 19/0042 |
| | | | | 62/529 |
| 2023/0158883 | A1* | 5/2023 | Hall | F01P 5/10 |
| | | | | 180/68.1 |
| 2023/0271478 | A1* | 8/2023 | Dong | B60H 1/32284 |

* cited by examiner

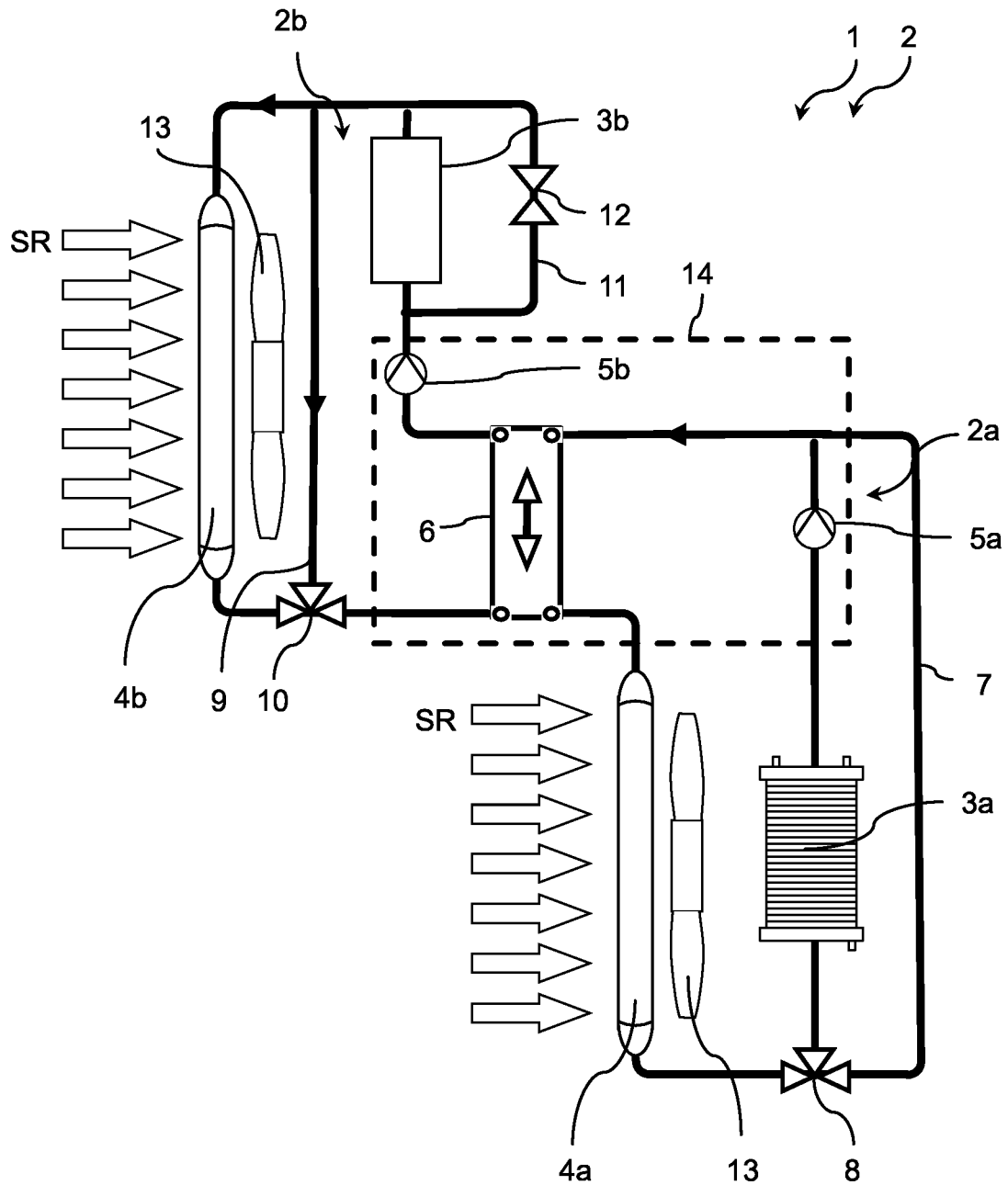

COOLING SYSTEM

CROSS-REFERENCE TO RELATED APPLICATIONS

This application claims priority to German Patent Application No. DE 10 2021 214 729.1, filed on Dec. 20, 2021, the contents of which is hereby incorporated by reference in its entirety.

TECHNICAL FIELD

The invention relates to a cooling system for a vehicle, in particular for a utility vehicle. The invention also relates to a method for operating the cooling system.

BACKGROUND

A cooling system for a vehicle always has to provide an adequate cooling capacity for an energy source and a brake. When in a vehicle a fuel cell as energy source and a retarder for braking are employed, an adequate cooling capacity during braking can often not be provided. This is due to the fact that the temperature of the coolant in the cooling system is predetermined by the maximum cooling temperature of the fuel cell. Thus, in order to avoid damaging the fuel cell, the temperature of the coolant in the cooling system always has to be kept below the maximum cooling temperature of the fuel cell. The maximum cooling temperature of the fuel cell is significantly below the possible cooling temperature of the brake of 90-105° C. The cooling capacity of the cooling system in the vehicle with the fuel cell is thus significantly reduced compared with the vehicle having a conventional internal combustion engine. In order to increase the cooling capacity of the cooling system, the cooling system—for example radiator and pumps—has to be enlarged. A cooling system enlarged in such a manner is cost-intensive and has an increased space requirement in the vehicle.

SUMMARY

The object of the invention therefore is to state, for a cooling system of the generic type, an improved or at least alternative embodiment, with which the described disadvantages are overcome. The object of the invention is to also provide a corresponding method for operating the cooling system.

According to the invention, this object is solved through the subject matter of the independent claim(s). Advantageous embodiments are the subject matter of the dependent claim(s).

The cooling system is provided for a vehicle, in particular for a utility vehicle. Here, the cooling system comprises a cooling circuit that can be flowed through by a coolant. The cooling circuit comprises a first heat source to be cooled at a lower temperature level and a second heat source that can be cooled at a higher temperature level. In addition, the cooling circuit comprises a first radiator and a second radiator. According to the invention, the first heat source, the first radiator, the second heat source and the second radiator are connected in series in the cooling circuit. In addition, the cooling circuit comprises a hydraulic switch, which divides the cooling circuit into a first partial circuit with the first heat source and the first radiator and into a second partial circuit with the second heat source and the second radiator.

In the cooling system according to the invention, the two partial circuits can be almost completely separated from one another hydraulically by means of the hydraulic switch and can be almost completely connected to one another hydraulically. Because of this, the cooling system according to the invention can be operated at least in a braking mode and in a normal mode. In the braking mode—as described in more detail below—the first heat source and the second heat source can be cooled at the different temperature levels. Accordingly, the first heat source in the cooling system can be cooled at a lower temperature level than the second heat source and an overheating of the first heat source can thereby be prevented. Accordingly, the second heat source can be cooled at a higher temperature level than the first heat source and the cooling capacity in the second partial circuit can thereby be significantly increased. In addition, an evaporation cooling for cooling the second heat source can be employed and the cooling capacity further increased.

With the cooling system according to the invention, a significantly greater cooling capacity for the second heat source—for example a water-cooled retarder—can be provided in the braking mode. The higher temperature level in the second partial circuit required for this purpose is made possible by largely decoupling the second partial circuit from the first partial circuit. The temperature level in the first partial circuit on the first heat source—for example a fuel cell—can thus be significantly below the temperature level of the second partial circuit. A simultaneous occurrence of high cooling capacities in both partial circuits must not be expected here. For this reason, the maximum achievable cooling capacity in the cooling system according to the invention is utilised to suit requirement and efficiently.

In the normal operating mode—as described in more detail below—exclusively the first heat source has to be cooled. With a low cooling capacity requirement, the first heat source can utilise the first radiator and with a higher cooling capacity requirements access the two radiators simultaneously because of the serial connection in the cooling circuit and thus be cooled intensively.

The first heat source can be in particular a fuel cell of the vehicle and the second heat source can be in particular a retarder of the vehicle. In order to enlarge the difference between the temperature levels, the first radiator can be connected upstream of the second radiator with respect to the air flow direction. In the process, the two radiators can overlap one another partially or completely in the air flow direction. Here, the respective radiator can be practically a coolant-air-radiator. The coolant can be in particular a liquid.

On the whole, a cooling capacity that is comparable with a cooling capacity in the conventional vehicle with an internal combustion engine can be achieved in the cooling system according to the invention during the braking mode. Here, installation space, weight and costs can be saved and an optimal cost-utilisation ratio with respect to the cooling capacity achieved.

Advantageously, a first pump in the first partial circuit can be connected in series with the first heat source and the first radiator and a second pump in the second partial circuit in series with the second heat source and with the second radiator. Here is it conceivable that the two pumps and lines leading to the pumps are combined into a module. Alternatively, the two pumps can be realised by a double pump having a common shaft and a coupling for adjusting rotational speeds in the two pumps that differ from one another. It is additionally conceivable that the two pumps are each realised by a pump with a viscous coupling and can be operated with a common motor. Advantageously, the two pumps can each have an adjustable impeller geometry for variable adjusting the mass flow of the coolant.

The first partial circuit can be fluidically connected to the hydraulic switch via a first inlet leading into the switch and a first outlet leading out of the switch. The second partial circuit can be fluidically connected to the hydraulic switch via a second inlet leading into the switch and a second outlet leading out of the switch. The flow and the mixing of the coolant in the hydraulic switch can then take place dependent on the adjusted pump pressure and/or on the adjusted rotational speed and/or on the adjusted mass flow of the two pumps. The degree of the mixing of the coolant in the hydraulic switch can be co-influenced also by an inner structure of the hydraulic switch. In particular, the mixing of the coolant can be influenced by suitable components positioned in between—for example perforated plate-like and/or flow-directing intermediate walls. The degree of the mixing is thus predominantly dependent on the adjusted pump pressure and/or on the adjusted rotational speed and/or on the adjusted mass flow of the two pumps and on the internal geometry and the size of the hydraulic switch and can be suitably adapted and influenced. Further, the position of the valves that may be provided in the cooling system if required is also important.

Advantageously it can be provided that the first partial circuit comprises a warming-up bypass line connected in parallel with the first heat source and a warming-up bypass valve. The warming-up bypass valve can preferentially be a switching valve or a regulating valve or a thermostat valve. Here, the warming-up bypass line can be closed and opened by means of the warming-up bypass valve. When the warming-up bypass line is opened by means of the warming-up bypass valve, only the first heat source and the warming-up bypass line can be flowed through. When the warming-up bypass line is closed by means of the warming-up bypass valve, the entire cooling circuit can be flowed through and the warming-up bypass line cannot be flowed through.

Alternatively or additionally it can be provided that the second partial circuit comprises a radiator bypass line and a radiator bypass valve connected in parallel with the second radiator. There, the radiator bypass line can be closed and opened by means of the radiator bypass valve. When the radiator bypass line is opened by means of the radiator bypass valve, the second radiator is bypassed. When the radiator bypass line is closed by means of the radiator bypass valve, the second radiator is flowed through. By means of the radiator bypass valve, the mass flow of the coolant can be distributed between the second radiator and the radiator bypass line. If undercooling of the first heat source and/or of the second heat source can be tolerated, the radiator bypass line and the radiator bypass valve can be omitted.

Alternatively or additionally it can be provided that the second partial circuit comprises a heat source bypass line and a heat source bypass shut-off valve connected in parallel with the second heat source. The heat source bypass line can be closed and opened by means of the heat source bypass shut-off valve. When the heat source bypass line is closed, the second heat source can be flowed through. When the heat source bypass line is opened, the second heat source can be bypassed. In a normal operating mode—as described in more detail below—the second heat source can be bypassed and by way of this a pressure loss on the coolant side of the switch-off second heat source avoided.

The invention also relates to a method for operating the cooling system described above. Here, a first pump in the first partial circuit and a second pump in the second partial circuit are connected in series. Here, the cooling system can be operated in a braking mode and/or in a normal operating mode and/or in a warming-up mode. As already explained above, the first heat source can be in particular a fuel cell and the second heat source in particular a retarder. The respective radiator can be in particular a coolant-air-radiator. The coolant can be in particular a liquid.

In the braking mode, the first heat source and the second heat source can be flowed through by the coolant and can pass heat on to the coolant. The two heat sources are cooled at the different temperature levels. Here, the first heat source can be in a no-load mode. There, the first pump and the second pump are switched on in the braking mode. The flow and the mixing of the coolant in the hydraulic switch is regulated dependent on the adjusted pump pressure and/or the adjusted rotational speed and/or on the adjusted mass flow of the two pumps. By way of the suitable regulation of the two pumps, the coolant flows in the hydraulic switch from a first inlet to a first outlet and from the second inlet to the second outlet. Because of this, the first partial circuit and the second partial circuit are almost completely separated hydraulically and the first partial circuit is flowed through by a first part of the coolant and the second partial circuit by a second part of the coolant.

In other words, the first heat source and the first radiator in the braking mode are flowed through by the first part of the coolant in the first partial circuit and the second heat source and the second radiator by the second part of the coolant in the second partial circuit almost independently of one another. In the hydraulic switch, a mixing of the two parts of the coolant additionally takes place and the second part of the coolant downstream of the hydraulic switch has a lower temperature than upstream of the hydraulic switch. In the braking mode, the temperature of the first part of the coolant in the first partial circuit can become lower than the temperature of the second part of the coolant in the second partial circuit. Because of this, the first heat source can be cooled at a lower temperature level and the second heat source at a higher temperature level. On the one hand, overheating and damaging the first heat source can thereby be prevented and on the other hand the cooling capacity on the second heat source increased.

In the braking mode, the temperature of the coolant upstream of the first heat source can advantageously be co-influenced by a delivery rate of the pump and an overheating of the first heat source avoided by lowering the delivery rate of the second pump.

In the normal operating mode, exclusively the first heat source is switched on and cooled. By contrast, the second heat source is switched off and need not be cooled. In the normal operating mode, the first pump and the second pump are switched on when a high cooling capacity is requested and the second heat source is switched off. The flow and the mixing of the coolant in the hydraulic switch are regulated dependent on the adjusted pump pressure and/or on the adjusted rotational speed and/or on the adjusted mass flow of the two pumps. By suitably regulating the two pumps, the coolant flows in the hydraulic switch almost completely from the first inlet to the second outlet and almost completely from the second inlet to the second outlet. The first partial circuit and the second partial circuit are almost completely connected hydraulically by means of the hydraulic switch and the first partial circuit and the second partial circuit are flowed through by a common part of the coolant.

In the normal operating mode, the first heat source, the first radiator and the second radiator are thus flowed through one after the other in series in the case of a high cooling capacity requirement. In the normal operating mode, the second-switched-off-heat source can be flowed through or be bypassed by way of a heat source bypass line connected in parallel with the second heat source. Since the second radiator is flowed through, the first heat source can be cooled by way of the two radiators and thus the temperature level of the first heat source be kept sufficiently low. By way of the radiator bypass line, the cooling capacity of the second radiator can be additionally adapted.

Alternatively, the first pump is switched on in the normal operating mode with a low cooling capacity requirement and the second heat source and the second pump switched off. The flow and the mixing of the coolant in the hydraulic switch are regulated dependent on the adjusted pump pressure and/or on the adjusted rotational speed and/or on the adjusted mass flow of the first pump. By suitably regulating the first pump, the coolant flows in the hydraulic switch from the first inlet to the first outlet and from the second inlet to the second outlet. Thus, the first partial circuit and the second partial circuit are almost completely separated hydraulically, wherein the first partial circuit is flowed through by a first part of the coolant and—since the second pump is switched off—there is almost no flow by a second part of the coolant through the second partial circuit.

In the normal operating mode with a low cooling capacity requirement, the second pump can be switched off and only the first pump switched on. With a high cooling capacity requirement of the first heat source, the second pump—as described above—can be additionally switched on and the two radiators can be flowed through with a high coolant flow. With a particularly advantageous matching of the two pumps and the hydraulic characteristics of the two partial circuits to one another, the mixing in the hydraulic switch is minimal and the cooling capacity on the first heat source maximal. Here, the flow through the two radiators is approximately in series. In the normal operating mode, the maximum cooling capacity can be achieved with a high cooling capacity requirement when the heat source bypass line of the second heat source is additionally opened. In addition, the cooling capacity can be increased by an evaporation cooling that may be present and a maximum additional activation of fans that may be available.

Both in the normal operating mode and also in the braking mode, the second radiator can be flowed through or at least partially bypassed via a radiator bypass line. In addition, the second heat source in the normal operating mode can be flowed through or bypassed by way of a heat source bypass line.

In the warming-up mode, exclusively the first heat source is switched on and heating takes place. By contrast, the second heat source is switched off. In the warming-up mode, the first pump is switched on and the second pump switched off. The second partial circuit and the first radiator are separated from the first heat source by means of a warming-up bypass valve and not flowed through. The warming-up bypass valve can be for example a thermostat valve. Then, only the first heat source and a warming-up bypass line connected in parallel with the heat source are flowed through in the cooling circuit. Practically, the first pump is also flowed through. In the warming-up mode, a minor part of the coolant or a reduced thermal mass flows through the first heat source and the coolant can be rapidly heated. Because of this, the first heat source can rapidly reach the working temperature.

Further important features and advantages of the invention are obtained from the subclaims, from the drawing and from the associated FIGURE description by way of the drawing.

It is to be understood that the features mentioned above and still to be explained in the following cannot only be used in the respective combination state, but also in other combinations or by themselves without leaving the scope of the present invention.

BRIEF DESCRIPTION OF THE DRAWINGS

Preferred exemplary embodiments of the invention are shown in the drawings and are explained in more detail in the following description.

The FIGURE shows a circuit diagram of a cooling system according to the invention.

DETAILED DESCRIPTION

The FIGURE shows a circuit diagram of a cooling system 1 according to the invention. Here, the cooling system 1 comprises a cooling circuit 2 with a first partial circuit 2a and with a second partial circuit 2b. In the cooling circuit 2, a first heat source 3a, a second heat source 3b, a first radiator 4a and a second radiator 4b are connected in series with one another. Here, the two partial circuits 2a and 2b are separated from one another by means of a hydraulic switch 6. In the first partial circuit 2a, the first heat source 3a and the first radiator 4a and in the second partial circuit 2b, the second heat source 3b and the first radiator 4b are connected in series with one another.

The cooling system 1 is provided for a vehicle, in particular for a utility vehicle. The first heat source 3a can be in particular a fuel cell and a second heat source 3b can be in particular a retarder. The first radiator 4a and the second radiator 4b can be coolant-air-radiators. The coolant is preferentially a liquid.

The cooling circuit 2 comprises a first pump 5a and a second pump 5b. In the first partial circuit 2a, the first pump 5a is directly connected downstream of the first heat source 3a. The term "directly" in this context means that the pump 5a and the respective heat source 3a are connected on a common flow line between two adjacent branch nodes. In the second partial circuit 2b, the second pump 5b is connected upstream of the second heat source 3a.

Further, the first partial circuit 2a comprises a warming-up bypass line 7 and a warming-up bypass valve 8. The warming-up bypass line 7 is connected in parallel with the first heat source 3a. When the warming-up bypass line 7 is opened by means of the warming-up bypass valve 8, the remaining radiator circuit 2 is fluidically separated from the first heat source 3a and only the first heat source 3a and the warming-up bypass line 7 can be flowed through. When the warming-up bypass line 7 is closed by means of the warming-up bypass valve 8, the entire cooling circuit 2 can be flowed through and the warming-up bypass line 7 cannot be flowed through.

The second partial circuit 2b comprises a radiator bypass line 9 and a radiator bypass valve 10. The radiator bypass line 9 is connected in parallel with the second radiator 4b. When the radiator bypass line 9 is opened by means of the radiator bypass valve 10, the second radiator 4b is bypassed. When the radiator bypass line 9 is closed by means of the radiator bypass valve 10, the second radiator 4b is flowed through and the coolant cooled.

In addition, the second partial circuit 2b comprises a heat source bypass line 11 and a heat source bypass shut-off valve 12. The heat source bypass line 11 is connected parallel with the second heat source 3b and the heat source bypass shut-off valve 12 is arranged in the heat source bypass line 11. When the heat source bypass line 11 is opened, the second heat source 3a can be bypassed. When the heat source bypass line 11 is closed, the second heat source 3b can be flowed through or not bypassed.

The two radiators 4a and 4b can be flowed through by air in an air flow direction SR. Here, the first radiator 4a and the second radiator 4b can completely or partially overlap one another in the air flow direction SR, wherein the first radiator 4a is connected upstream of the second radiator 4b with respect to the air flow direction SR. Behind the radiators 4a and 4b, one or more blowers 13 are arranged, which can intensify the flow of air through the radiators 4a and 4b.

In this exemplary embodiment, the two pumps 5a and 5b and the hydraulic switch 6 are combined in a common module 14—as indicated by broken lines. Basically, however, the two pumps 5a and 5b and the hydraulic switch 6 can be installed separately from one another. Here, the module 14 includes five liquid connections which lead to the first heat source 3a, to the second heat source 3b, to the warming-up bypass line 7, to the first radiator 4a and to the second radiator 4b.

Regardless of the embodiment, the cooling system 1 can be operated by means of a method according to the invention in a braking mode and/or in a normal operating mode and/or in a warming-up mode.

In the braking mode, the two heat sources 3a and 3b and the two pumps 5a and 5b are switched on. By way of the two switched-on pumps 5a and 5b and the hydraulic switch 6, the two partial circuits 2a and 2b are hydraulically separated from one another almost completely. A mixing of the coolant in the hydraulic switch 6 however continues to take place. The two partial circuits 2a and 2b are thus flowed through by parts of the coolant that are almost completely separated from one another. Starting out from a mean temperature level in the hydraulic switch 6, the coolant is suctioned through the first radiator 4a with the first pump 5a. In the first radiator 4a, the coolant is cooled and then flows through the first heat source 3a. In the braking mode, the two heat sources 3a and 3b can be suitably cooled at differing temperature levels. Accordingly, the first heat source 3a can be cooled at a lower temperature level and the second heat source 3b at a higher temperature level. Because of this, an overheating of the first heat source 3a can be prevented and the cooling capacity on the second heat source 3b increased.

In the normal operating mode, the first heat source 3a is switched on and the second heat source 3b switched off. Accordingly, exclusively the first heat source 3a has to be cooled. With a low cooling capacity requirement, the first pump 5a is switched on and the second pump 5b switched off in this case. The first pump 5a is then regulated so that the two partial circuits 2a and 2b are almost completely separated from one another hydraulically. However, a mixing of the coolant in the hydraulic switch 6 continues to take place. Here, the first partial circuit 2a is flowed through and—since the second pump 5b is switched off—there is almost no flow through the second partial circuit 2b. The cooling of the first heat source 3a is solely assumed by the first radiator 4a.

With a high cooling capacity requirement, the two pumps 5a and 5b are switched on in the normal operating mode. Here, the pumps 5a and 5b are regulated so that partial circuits 2a and 2b or the entire cooling circuit 2 are flowed through by a common part of the coolant. However, a mixing of the coolant in the hydraulic switch 6 continues to take place. Here, the two radiators 4a and 4b are flowed through by the coolant in series and the first heat source 3a is cooled by the two radiators 4a and 4b. In the process, the second heat source 3b can be flowed through or bypassed by way of the heat source bypass line 11. The second radiator 4b can be flowed through or at least partially bypassed by way of the radiator bypass line 9.

In the warming-up mode, the warming-up bypass valve 8 is switched so that exclusively the first heat source 3a, the first pump 5a and the warming-up bypass line 7 are flowed through. Here, the second heat source 3b can be flowed through or bypassed via the heat source bypass line 11. The second radiator 4b can also be flowed through or bypassed via the radiator bypass line 9. In the warming-up mode, a reduced thermal mass flows through the first heat source 3a and the coolant can be rapidly heated.

The invention claimed is:

1. A cooling system for a vehicle, comprising:
   a cooling circuit through which a coolant is flowable;
   the cooling circuit including:
      a first heat source coolable at a lower temperature level;
      a first radiator;
      a second heat source coolable at a higher temperature level; and
      a second radiator;
   wherein, in the cooling circuit, the first heat source, the first radiator, the second heat source, and the second radiator are connected in series with one another;
   wherein the cooling circuit further includes a hydraulic switch dividing the cooling circuit into (i) a first partial circuit with the first heat source and the first radiator and (ii) a second partial circuit with the second heat source and the second radiator;
   wherein the first partial circuit includes:
      a warming-up bypass line connected in parallel with the first heat source and through which the coolant is flowable to bypass the first heat source; and
      a warming-up bypass valve via which the warming-up bypass line is openable and closable.

2. The cooling system according to claim 1, further comprising:
   a first pump arranged in the first partial circuit and connected in series with the first heat source and with the first radiator; and
   a second pump arranged in the second partial circuit and connected in series with the second heat source and with the second radiator.

3. The cooling system according to claim 2, wherein:
   the first partial circuit is fluidically connected to the hydraulic switch via a first inlet leading into the hydraulic switch and a first outlet leading out of the hydraulic switch;
   the second partial circuit is fluidically connected to the hydraulic switch via a second inlet leading into the hydraulic switch and a second outlet leading out of the hydraulic switch; and
   a flow and a mixing of the coolant in the hydraulic switch is dependent on at least one of an adjusted pump pressure, an adjusted rotational speed, and an adjusted mass flow of the first pump and the second pump.

4. The cooling system according to claim 2, wherein the first pump, the second pump, and a plurality of lines extending to at least one of the first pump and the second pump are combined into a module.

5. The cooling system according to claim 1, wherein the first radiator, with respect to an air flow direction, is connected upstream of the second radiator.

6. A method for operating the cooling system according to claim 1, comprising operating the cooling system in at least one of a braking mode, a normal operating mode, and a warming-up mode; and
wherein the cooling system includes a first pump arranged in the first partial circuit and a second pump arranged in the second partial circuit, the first pump and the second pump connected in series.

7. The method according to claim 6, wherein:
the cooling system is operated in the braking mode; and
operating the cooling system in the braking mode includes:
switching on the first pump and the second pump;
regulating a flow and a mixing of the coolant in the hydraulic switch dependent on at least one of an adjusted pump pressure, an adjusted rotational speed, and an adjusted mass flow of the first pump and the second pump;
flowing the coolant in the hydraulic switch from a first inlet to a first outlet and from a second inlet to a second outlet; and
flowing a first part of the coolant through the first partial circuit and flowing a second part of the coolant through the second partial circuit such that the first partial circuit and the second partial circuit are separated hydraulically.

8. The method according to claim 6, wherein:
the cooling system is operated in the braking mode; and
operating the cooling system in the braking mode includes:
co-influencing a temperature of the coolant upstream of the first heat source via a delivery rate of the first pump; and
avoiding an overheating of the first heat source via lowering a delivery rate of the second pump.

9. The method according to claim 6, wherein:
the cooling system is operated in the normal operating mode with a high cooling capacity requirement;
the hydraulic switch includes a first inlet, a first outlet, a second inlet, and a second outlet; and
operating the cooling system in the normal operating mode with the high cooling capacity requirement includes:
switching on the first pump and the second pump, and switching off the second heat source;
regulating a flow and a mixing of the coolant in the hydraulic switch dependent on at least one of an adjusted pump pressure, an adjusted rotational speed, and an adjusted mass flow of the first pump and the second pump;
flowing the coolant in the hydraulic switch from the first inlet to the second outlet and from the second inlet to the second outlet; and
flowing a common part of the coolant through the first partial circuit and the second partial circuit such that the first partial circuit and the second partial circuit are connected hydraulically.

10. The method according to claim 6, wherein:
the cooling system is operated in the normal operating mode with a low cooling capacity requirement;
operating the cooling system in the normal operating mode with the low cooling capacity requirement includes:
switching on the first pump and switching off the second heat source and the second pump;
regulating a flow and a mixing of the coolant in the hydraulic switch dependent on at least one of an adjusted pump pressure, an adjusted rotational speed, and an adjusted mass flow of the first pump;
flowing the coolant in the hydraulic switch from a first inlet to a first outlet and from a second inlet to a second outlet; and
flowing a first part of the coolant through the first partial circuit and providing no flow of a second part of the coolant through the second partial circuit such that the first partial circuit and the second partial circuit are separated hydraulically.

11. The method according to claim 6, wherein:
in at least one of the normal operating mode and the braking mode, the second radiator is at least one of (i) flowed through and (ii) bypassed via a radiator bypass line; and
in the normal operating mode, the second heat source is at least one of (i) flowed through and (ii) bypassed via a heat source bypass line.

12. The method according to claim 6, wherein:
the cooling system is operated in the warming-up mode; and
operating the cooling system in the warming-up mode includes:
switching on the first pump and switching off the second pump;
separating the second partial circuit and the first radiator from the first heat source via a warming-up bypass valve and not flowing the coolant through the second partial circuit and the first radiator; and
flowing the coolant through the first heat source and a warming-up bypass line connected in parallel with the first heat source.

13. The cooling system according to claim 1, wherein the second partial circuit includes:
a radiator bypass line connected in parallel with the second radiator and through which the coolant is flowable to bypass the second radiator; and
a radiator bypass valve via which the radiator bypass line is openable and closable.

14. The cooling system according to claim 1, wherein the second partial circuit includes:
a heat source bypass line connected in parallel with the second heat source and through which the coolant is flowable to bypass the second heat source; and
a heat source bypass shut-off valve via which the heat source bypass line is openable and closable.

15. The cooling system according to claim 2, wherein:
the first pump and the second pump are configured as a double pump; and
the double pump includes a common shaft and a magnetic coupling configured to adjust a first rotational speed in the first pump and a second rotational speed, which differs from the first rotational speed, in the second pump.

16. The cooling system according to claim 2, wherein the first pump and the second pump each include a viscous coupling and are operable via a common motor.

17. The cooling system according to claim 2, wherein the first pump and the second pump each include an adjustable impeller geometry for variably adjusting a mass flow of the coolant.

18. A cooling system for a vehicle, comprising:
a cooling circuit through which a coolant is flowable;
a hydraulic switch dividing the cooling circuit into a first partial circuit and a second partial circuit;
the first partial circuit including:
a first heat source;

a first radiator;
a first pump;
a warming-up bypass line connected in parallel with the first heat source and through which the coolant is flowable to bypass the first heat source; and
a warming-up bypass valve via which the warming-up bypass line is openable and closable;
the second partial circuit including:
a second heat source;
a second radiator;
a second pump;
a radiator bypass line connected in parallel with the second radiator and through which the coolant is flowable to bypass the second radiator;
a radiator bypass valve via which the radiator bypass line is openable and closable;
a heat source bypass line connected in parallel with the second heat source and through which the coolant is flowable to bypass the second heat source; and
a heat source bypass shut-off valve via which the heat source bypass line is openable and closable; and
wherein, in the cooling circuit, the first heat source, the first radiator, the second heat source, and the second radiator are connected in series with one another.

19. A method for operating the cooling system according to claim 18, comprising operating the cooling system in at least one of a braking mode, a normal operating mode with a high cooling capacity requirement, and a normal operating mode with a low cooling capacity requirement, wherein:
the first pump and the second pump are connected in series;
the hydraulic switch includes a first inlet, a first outlet, a second inlet, and a second outlet;
operating the cooling system in the braking mode includes:
switching on the first pump and the second pump;
regulating a flow and a mixing of the coolant in the hydraulic switch dependent on at least one of an adjusted pump pressure, an adjusted rotational speed, and an adjusted mass flow of the first pump and the second pump;
flowing the coolant in the hydraulic switch from the first inlet to the first outlet and from the second inlet to the second outlet; and
flowing a first part of the coolant through the first partial circuit and flowing a second part of the coolant through the second partial circuit such that the first partial circuit and the second partial circuit are separated hydraulically;
operating the cooling system in the normal operating mode with the high cooling capacity requirement includes:
switching on the first pump and the second pump, and switching off the second heat source;
regulating the flow and the mixing of the coolant in the hydraulic switch dependent on at least one of the adjusted pump pressure, the adjusted rotational speed, and the adjusted mass flow of the first pump and the second pump;
flowing the coolant in the hydraulic switch from the first inlet to the second outlet and from the second inlet to the second outlet; and
flowing a common part of the coolant through the first partial circuit and the second partial circuit such that the first partial circuit and the second partial circuit are connected hydraulically; and
operating the cooling system in the normal operating mode with the low cooling capacity requirement includes:
switching on the first pump and switching off the second heat source and the second pump;
regulating the flow and the mixing of the coolant in the hydraulic switch dependent on at least one of the adjusted pump pressure, the adjusted rotational speed, and the adjusted mass flow of the first pump;
flowing the coolant in the hydraulic switch from the first inlet to the first outlet and from the second inlet to the second outlet; and
flowing a portion of the coolant through the first partial circuit and providing no flow of a second part of the coolant through the second partial circuit such that the first partial circuit and the second partial circuit are separated hydraulically.

20. A method for operating a cooling system for a vehicle, the cooling system including a cooling circuit through which a coolant is flowable; the cooling circuit including a first heat source coolable at a lower temperature level, a first radiator, a second heat source coolable at a higher temperature level, a second radiator, a first pump, a second pump, and a hydraulic switch; the first heat source, the first radiator, the second heat source, and the second radiator connected in series with one another in the cooling circuit; the hydraulic switch dividing the cooling circuit into (i) a first partial circuit with the first heat source, the first radiator, and the first pump and (ii) a second partial circuit with the second heat source, the second radiator, and the second pump; the first pump and the second pump connected in series; the method comprising:
operating the cooling system in at least one of a braking mode, a normal operating mode, and a warming-up mode;
wherein the cooling system is operated in the braking mode; and
wherein operating the cooling system in the braking mode includes:
switching on the first pump and the second pump;
regulating a flow and a mixing of the coolant in the hydraulic switch dependent on at least one of an adjusted pump pressure, an adjusted rotational speed, and an adjusted mass flow of the first pump and the second pump;
flowing the coolant in the hydraulic switch from a first inlet to a first outlet and from a second inlet to a second outlet; and
flowing a first part of the coolant through the first partial circuit and flowing a second part of the coolant through the second partial circuit such that the first partial circuit and the second partial circuit are separated hydraulically.

* * * * *